United States Patent

[11] 3,560,818

| [72] | Inventor | Carmelo J. Amato<br>Livonia, Mich. |
|---|---|---|
| [21] | Appl. No. | 795,792 |
| [22] | Filed | Feb. 3, 1969 |
| [45] | Patented | Feb. 2, 1971 |
| [73] | Assignee | Ford Motor Company<br>Dearborn, Mich.<br>a corporation of Delaware |

[54] RELUCTANCE MOTOR POWER CIRCUIT USING DUAL ENERGY SOURCES
11 Claims, 4 Drawing Figs.

[52] U.S. Cl. .................................................. 318/138,
318/139; 321/45; 310/163
[51] Int. Cl. ............................................. H02k 29/02
[50] Field of Search.................................... 321/45-C,
43; 318/139, 138, 345, 254, (Inquired); 310/163

[56] References Cited
UNITED STATES PATENTS

| 3,207,974 | 9/1965 | McMurray | 321/45(C) |
| 3,299,336 | 1/1967 | Johannes | 318/138 |
| 3,308,371 | 3/1967 | Studtmann | 321/45(C) |
| 3,321,685 | 5/1967 | Johannes | 318/138 |
| 3,437,854 | 4/1969 | Oiso | 318/138 |
| 3,444,447 | 5/1969 | Nenell | 318/138 |
| 3,466,519 | 9/1969 | Platnick | 318/138 |

*Primary Examiner*—G.R. Simmons
*Attorneys*—John R. Faulkner and Glenn S. Arendsen ABSTRACT: Power is supplied to pairs of motor windings having varying inductances during motor operation from two batteries connected in series. Conventional SCRs and diodes shape winding current to achieve highly efficient motor operation, provide full and partial motoring and regenerative braking, and return winding current to the batteries at the ends of the motoring cycle to improve efficiency. One battery supplies operating current to one motor winding and the residual current from that winding is returned to the second battery, which supplies operating current to the second winding. Residual current from the second winding is returned to the first battery.

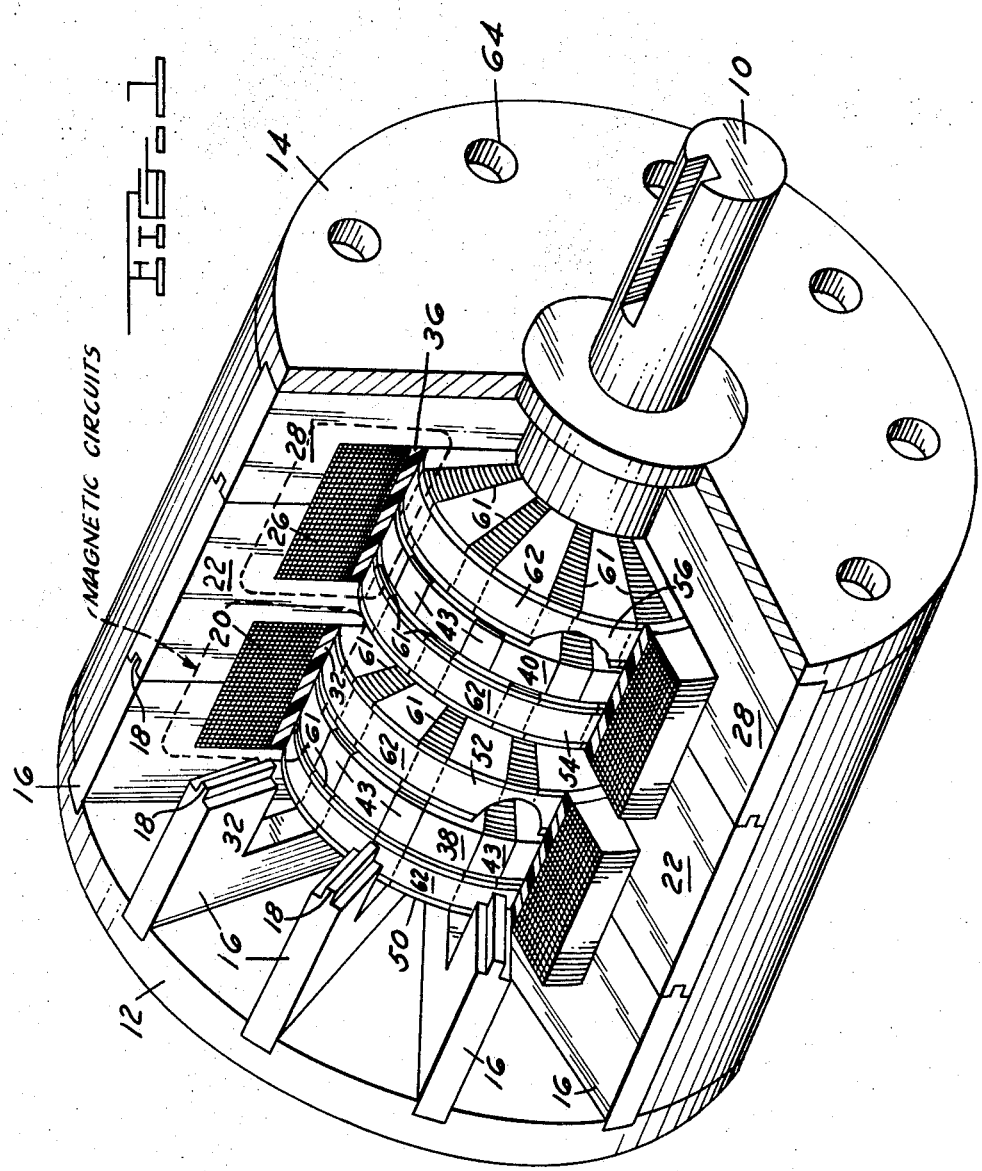
INVENTOR
CARMELO J. AMATO
BY
John R. Faulkner
Glenn S. Arendsen
ATTORNEYS

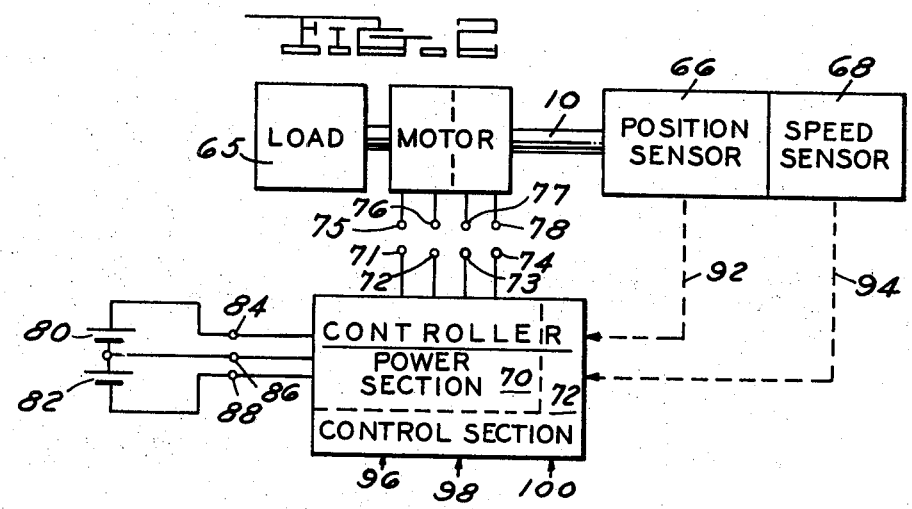
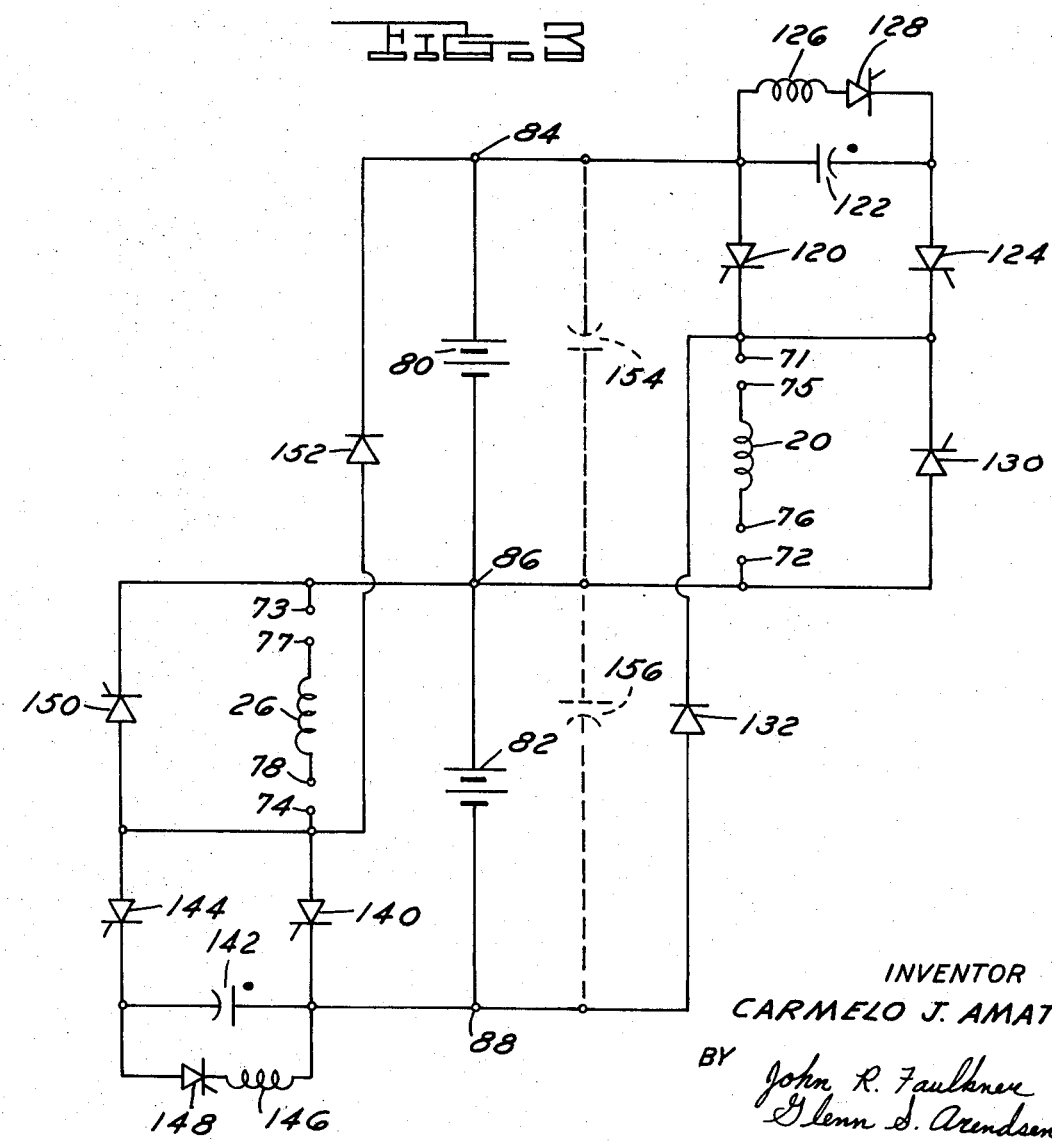

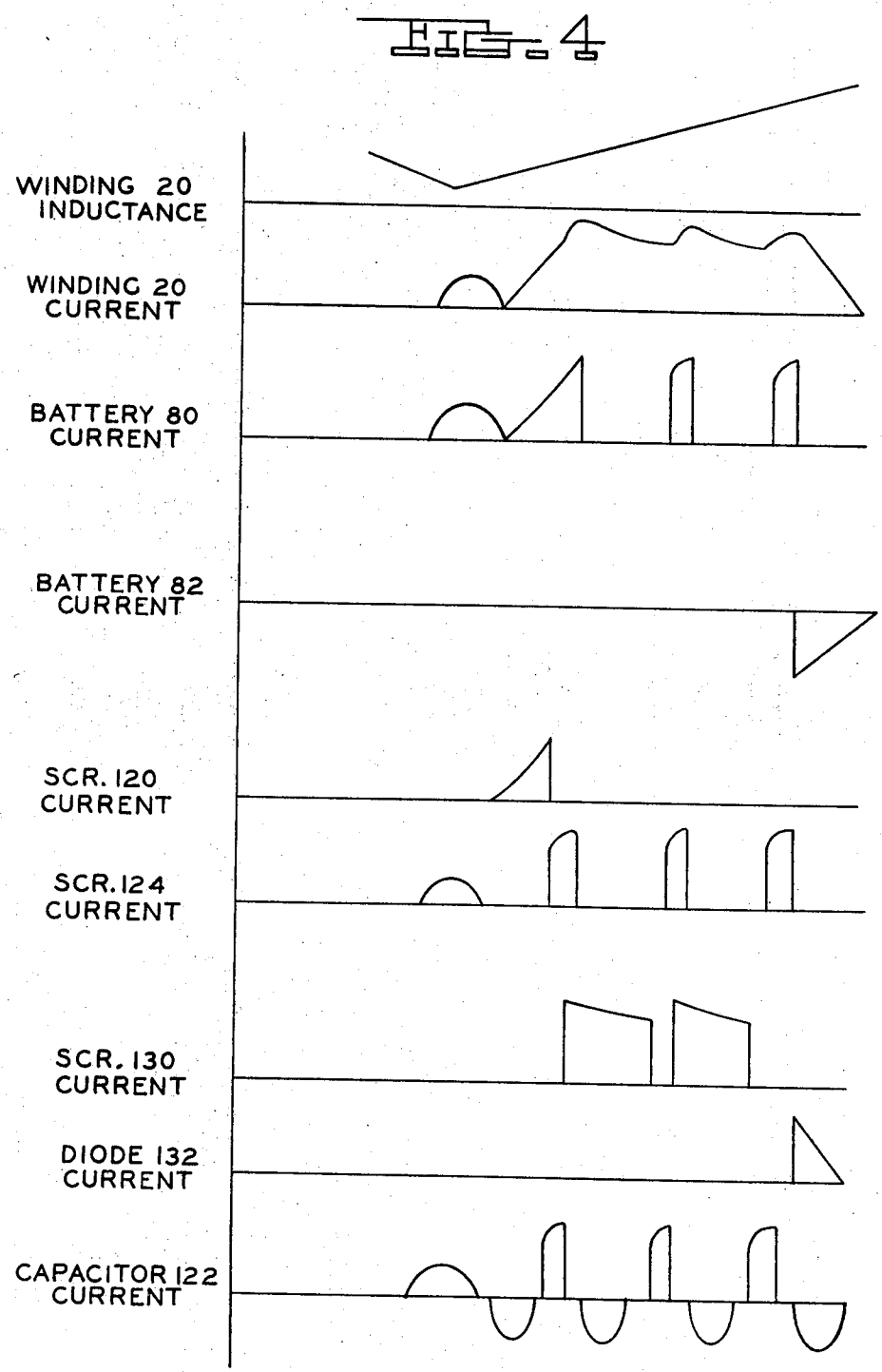

3,560,818

RELUCTANCE MOTOR POWER CIRCUIT USING DUAL ENERGY SOURCES

SUMMARY OF THE INVENTION

Brushless electric motors are being used in a variety of applications where a high torque is required at low speeds and where the motors must be capable of operating at relatively high speeds exceeding 6,000 r.p.m. In many applications, such motors must operate from a DC source of electrical energy such as a storage battery. Previous circuits used to couple the motor windings to DC power sources contained large numbers of semiconductors to approach the preferred waveforms and wasted considerably amounts of electrical energy at the end of the motoring cycle.

The power circuit provided by this invention uses controlled rectifiers and diodes to couple pairs of DC sources of electrical energy to pairs of windings of variable reluctance-type motors in a manner producing a high degree of electrical efficiency. Winding current is shaped to approach a desired waveform via a process provided by the invention. Each motor winding is coupled to batteries serving as the DC energy sources by individual power circuits that include a main solid-state switching device having its power terminals in series with one battery and one motor winding. A rectifier is connected in series with the motor winding and the second battery so the rectifier is reverse biased by the second battery. A freewheeling solid-state switching device is coupled in parallel with each motor winding. In parallel with each main switching device is a commutating capacitor connected in series with a commutating solid-state switching device. Circuits for reversing the charge on each commutating capacitor include an inductor in series with a solid-state switching device.

A process for operating the power circuit produces current waveforms in the motor windings that approach a highly desirable square wave. In the process, one energy source is coupled across one winding to produce motoring current in the winding. The second energy source is coupled to the first winding by the rectifier that is reverse biased by the energy sources. Self-inductance voltage of the winding forward biases the rectifier and returns current to the second energy source at a predetermined point in the operation. The commutating capacitors are coupled so the reversed charge thereon can be applied to the motor winding to reinforce winding current. After reinforcement, winding current is freewheeled to approach the desired waveform.

A disc-type variable reluctance motor is preferably used with the power circuit of this invention. Smooth torque generation is provided by using multiple phases although the phases must be even in number. Each phase comprises a toroidal winding that surrounds a stationary stator disc having pie-shaped sections of laminated steel spaced by minimum permeance sections usually made of aluminum or reinforced polymeric materials. A rotor disc of similar construction is mounted on each side of the stator disc. The periphery of each rotor is wound with a thin layer of a high strength, low permeance material such as fiberglass to increase the maximum potential rotor speed.

The power circuit of this invention is useful particularly in an electrically powered vehicle where the disc-type motor is connected to a vehicle wheel. High torque is generated at low speeds by the idealized wave shape produced by the power circuit, and the current returned to the batteries improves significantly the overall efficiency. Moreover, vehicle braking similar to the braking generated by an internal combustion engine can be provided and the energy generated during vehicle braking returned to the energy sources without additional power circuit components.

Speed sensors and position sensors are connected to the motor shaft and coupled to the control section of a controller that contains the power circuit. A torque level input, forward or reverse input, and a system protection input also are coupled to the control section which combines the inputs to produce the desired switching sequence of the switching devices in the power circuit. System protection inputs include devices for shutting off all circuits to a motor in case the load on the motor disappears suddenly, such as when a vehicle wheel begins spinning on ice. The torque level input and the forward or reverse inputs are of course controlled by the driver or operator.

BRIEF DESCRIPTION OF THE DRAWINGS

FIG. 1 is a sectioned perspective showing the construction of a two-phase disc-type reluctance motor capable of using the power circuit of this invention to great advantage. FIG. 2 is a schematic of the overall system showing the relationship of the controller and the batteries to the motor. FIG. 3 is a schematic of a power circuit of this invention showing both batteries and motor windings, FIG. 4 shows the waveforms obtained during low-speed maximum torque operation of the first phase winding. The same waveforms are produced in the second phase winding.

DETAILED DESCRIPTION

Referring to the motor construction of FIG. 1, a motor shaft 10 is mounted rotatably in two end plates 12 and 14. A plurality of L-shaped members 16 have their longer legs positioned in shallow grooves on the inner face of end plate 12. The shorter legs of members 16 project axially inward with the outer surfaces thereof at the approximate level of the outer periphery of end plate 12. Members 16 are made of laminated steel with the laminations running parallel to the shaft axis and have small radially directed tongues 18 at the inner surfaces of the shorter legs.

A toroidal winding 20 has one-half of its width fitting into the steps of L-shaped members 16 and is held in place by a plurality of T-shaped members 22 (some of the members have been removed to reveal the internal structure of the motor). Members 22 have a groove cooperating with tongue 18. A toroidal winding 26 for the second phase fits into the steps of the T-shaped members. Additional L-shaped members 28 fit in grooves in end plate 14 and hold the second phase winding in place. Members 22 and 28 also are made of laminated steel.

Rims 32 and 36 of fiberglass are positioned against the radially interior surfaces of respective windings 20 and 26 and are connected to the outer peripheries of respective stator discs 38 and 40. Each stator disc comprises a plurality of pie-shaped laminated steel sections 43 separated by a material having a low magnetic permeance such as aluminum or a reinforced phenolic resin. The number of sections 43 in each disc corresponds to the number of L-shaped members 16 and the sections in each stator disc are aligned with members 16.

Rotor discs 50 and 52 are fastened to shaft 10 and positioned on each side of stator disc 38 to complete the first phase of the motor. Similarly, rotor discs 54 and 56 are positioned on each side of stator disc 40 to complete the second phase. Each rotor disc also has a pie-shaped section 61 of laminated steel surrounded by a section of a low permeance material. In a two-phase motor, the laminated sections of both the stator discs and the rotor discs have a peripheral width approximately corresponding to the width of members 16 and are surrounded on each side by this width of the lower permeance material.

A narrow groove is cut into the periphery of each rotor disc and this groove is filled with a high strength layer of fiberglass 62. Laminated sections 61 of the rotor discs in each phase are aligned with each other. Additionally, the laminated sections of the rotor discs in the second phase are spaced peripherally by the width of a section from the laminated sections of the discs in the first phase. Motors having 4, 6 or more phases can have the rotor discs in 2 or more phases aligned with each other or can have each set of rotor discs spaced from the other sets by any predetermined amount. Long bolts pass through appropriate holes 64 in end plates 12 and 14 to clamp the parts of the motor together.

As shown in FIG. 2, the motor of FIG. 1 has its shaft 10 connected to a load 65 on one side and a position sensor 66 and speed sensor 68 on the other side. Both speed and position information can be obtained from a common sensor if desired. In an electrically powered automobile, a vehicle driving wheel constitutes load 65. A controller made up of a power section 70 and a control section 72 has output terminals 71 and 72 connected to the terminals 75 and 76 of the first phase winding 20 and output terminals 73 and 74 connected to terminals 77 and 78 of the second phase winding 26. Two batteries 80 and 82 having essentially equal voltage and energy characteristics are coupled in series with each other. Battery 80 is coupled to the power section of the controller via positive terminal 84 and intermediate terminal 86, and battery 82 is coupled to the power section via intermediate terminal 86 and negative terminal 88.

Signals generated by the position sensor and the speed sensor are fed into control section 72 as indicated by dashed lines 92 and 94. Signals representative of the desired torque input, a forward or reverse function, and a system protection input also are applied to control section 72 as represented by arrows 96, 98 and 100.

Referring to the power circuit shown in FIG. 3, battery terminal 84 is connected to the anode of a silicon-controlled rectifier 120. SCR 120 serves as the main solid-state switching device and has its cathode connected to terminal 71. Winding 20 has one side connected to terminal 71 and the other side connected to terminal 72 which is coupled to battery terminal 86. Battery terminal 84 also is connected to the undotted plate of a capacitor 122 that has its dotted plate connected to the anode of a silicon-controlled rectifier 124 (the plates are designated by dots for illustrative purposes only). SCR 124 serves as the commutating solid-state switching device and has its anode connected to terminal 71. Thus the circuit made up of capacitor 122 and SCR 124 is in parallel with SCR 120.

One side of an inductor 126 is connected to the undotted plate of capacitor 122 and the other side is connected to the anode of a silicon controlled rectifier 128. The cathode of SCR 128 is connected to the dotted plate of capacitor 122. A silicon-controlled rectifier 130 that serves as the freewheeling solid-state switching device has its cathode connected to terminal 71 and its anode connected to terminal 72. The cathode of a diode 132 is connected to terminal 71 and the anode is connected to negative battery terminal 88. The above components make up the circuitry coupling the batteries to the first phase winding 20.

The circuit for the second phase winding 26 is essentially similar. A silicon-controlled rectifier 140 serves as the main switching device. SCR 140 has its anode connected to terminal 74 and its cathode connected to battery terminal 88. A commutating capacitor 142 has its dotted plate connected to the cathode of SCR 140 and its undotted plate connected to the cathode of a commutating SCR 144. The anode of SCR 144 is connected to terminal 74.

One side of an inductor 146 is connected to the dotted plate of capacitor 142 and the other side is connected to the cathode of a silicon-controlled rectifier 148. The anode of SCR 148 is connected to the undotted plate of capacitor freewheeling switching device has its anode connected to terminal 74 and its cathode connected to terminal 73. A diode 152 has its anode connected to terminal 74 and its cathode connected to battery terminal 84. If desired, filtering capacitors 154 and 156 can be connected in parallel with batteries 80 and 82 respectively.

The FIG. 3 circuit can be operated in several different ways, each of which produces a different motor characteristic. Maximum power operation is described below with reference to the waveforms shown in FIG. 4. Circuit connections and operations are essentially similar for both windings and the FIG. 4 waveforms apply to the operation of the second phase winding 26 as well.

As the laminated section 61 of rotor discs 50 and 52 rotate toward alignment with laminated section 43 of stator disc 38, the self-inductance of winding 20 begins increasing because of the increasing magnetic coupling. Commutating capacitor 122 is charged by applying a triggering pulse to the gate terminal of SCR 124. The relatively small amount of charging current passes through winding 20 and thereby provides some motoring torque. When the voltage on the undotted plate of capacitor 122 approximately equals the voltage of batteries 80 and 82, SCR 124 self-commutates. The charge on capacitor 122 is reversed promptly by triggering SCR 128. Inductor 126 then pumps the charge to the dotted plate of capacitor 122.

Main motoring torque then is produced by triggering SCR 120 to apply the voltage of battery 80 directly across winding 20. When the current in winding 20 reaches some predetermined value a pulse is applied to the gate terminal of SCR 124. The predetermined current value is sensed by any sensing means associated with the circuit and is selected according to the motoring torque desired. Triggering SCR 124 applies the voltage stored on capacitor 122 across SCR 120 and thereby commutates SCR 120. Capacitor 122 discharges through winding 20 and then a positive charge begins building on the undotted plate of capacitor 122. Capacitor 122 thus increases slightly the current in winding 20.

When capacitor 122 has charged to the voltage of battery 80, a pulse then is applied to the gate terminal of SCR 130 and the current in winding freewheels through the circuit formed by SCR 130 under the driving force of the winding self-inductance. SCR 124 then self-commutates. While this freewheeling is taking place, the charge on capacitor 122 again is reversed by triggering SCR 128. When the freewheeling current through winding 20 decays to some predetermined value, the current is reinforced by triggering SCR 124 to discharge capacitor 122 through winding 20 and then recharge the capacitor from battery 80. When the capacitor has recharged to battery voltage on its undotted plate SCR 130 again is triggered and another freewheeling mode takes place. During the freewheeling, the charge on capacitor 122 again is reversed by triggering SCR 128. This method of operation continues for the desired number of freewheeling modes.

As the laminated sections 61 of the rotors approach perfect alignment with the laminated sections 43 of the stator, the current in winding 20 must be removed as rapidly as possible since any current present in the increment of rotation following perfect alignment produces a braking torque. Current is removed from winding 20 by failing to trigger SCR 130 after the winding current has been reinforced from capacitor 122. Winding 20 then is connected across battery 82 by diode 132. Because of the energy stored in winding 20, diode 132 remains forward biased so the current in the winding passes into battery 82.

The self-inductance of the second phase winding 26 in the two phase motor described above now begins increasing and by a similar technique current is applied thereto to produce motoring torque. Capacitor 142 is charged by triggering SCR 144, main motoring torque is produced by triggering SCR 140, and freewheeling is produced by triggering SCR 150. Note that the motoring current for winding 26 is supplied by battery 82 and the current remaining in the winding at the end of the motoring cycle is returned to battery 80.

Partial torque operation is achieved by appropriately limiting the winding currents; such limitations are determined by commutation of SCR 120 at the appropriate current level. Less efficient partial torque operations can be provided by using a smaller number of freewheeling modes. Maximum torque is achieved at high motor speeds by maintaining a high current level but reducing the freewheeling can be eliminated if desired. Motor operation in the reverse direction is achieved by triggering the circuit so the magnetic flux generated by winding current draws the laminated sections into alignment from the opposite direction.

The circuit of this invention also can be used in a regenerative braking mode of operation by triggering the SCRs while the winding inductance is decreasing, which occurs while the laminated sections 61 are moving out of alignment with laminated sections 43. Transistors or other solid-state switching devices can be substituted for the SCRs if desired. The commutating circuits for such transistors then include the connections to the base terminals of the transistors.

Batteries 80 and 82 can be the two halves of a single battery having a center tap if desired. Only one motor winding can be operated by eliminating the second winding and its connecting circuitry and using a battery having a lower potential as battery 82. Self-inductance of winding 20 forward biases the smaller battery during capacitor charging so the smaller battery assists in charging the commutating capacitor to the sum of the battery voltages. Greater current reinforcement thus is achieved. Current remaining in the winding at the end of a cycle passes into the smaller battery as described above.

I claim:

1. In a reluctance motor having a pair of motor windings, said motor windings having varying inductances during motor operation, a power circuit comprising:
   two DC sources of electrical energy connected in series; and
   individual power circuits connecting said windings to said DC sources, each of said power circuits including:
      a main solid state switching device having its power terminals in series with its motor winding across one of said DC sources;
      a freewheeling solid state switching device in parallel with said motor winding and connected to conduct current through said motor winding in the same direction as the current established in said winding by said main switching device; and
      rectifying means connected in series with said motor winding and the other DC source, said rectifying means being reversed biased by said other DC source, said rectifying means being capable of becoming forward biased by the self-inductance of its series connected motor winding to apply energy from the motor winding to said other DC source.

2. The reluctance motor of claim 1 in which said switching devices are thyristors and in which each power circuit includes:
   a commutating capacitor in series with a commutating thyristor, said commutating capacitor and commutating thyristor being in parallel with said main switching device; and
   means for reversing the charge on said commutating capacitor.

3. The reluctance motor of claim 2 in which the sources of electrical energy are approximately equal in voltage and energy characteristics.

4. The reluctance motor of claim 3 comprising means for discharging the commutating capacitors through the motor windings to reinforce the winding currents.

5. The reluctance motor of claim 4 in which each means for discharging the capacitors through the motor windings comprises:
   means for reversing the charge across the capacitor; and
   a solid-state switching device in series with said capacitor and motor winding and in parallel with said main solid-state switching device.

6. A process for producing current in a pair of windings of a variable reluctance motor with a pair of electrical energy sources comprising:
   coupling one energy source across one winding to produce motoring current in said winding;
   coupling said winding to the second energy source by a rectifying means that is reverse biased by the first energy source and forward biased by the voltage of the self-inductance of said winding;
   freewheeling currents through said windings after said currents have been reinforced; and
   returning current to the second energy source when the voltage of the self-inductance of said winding forward biases said rectifying means.

7. The process of claim 6 comprising:
   coupling the second energy source across the second winding to produce motoring current in said second winding;
   coupling said second winding to the first energy source by a second rectifying means that is reverse biased by the first energy source and forward biased by the voltage of the self-inductance of the second winding; and
   returning current to the first energy source when the voltage of the self-inductance of the second winding forward biases said second rectifying means.

8. The process of claim 7 comprising charging capacitors from said energy sources, reversing the charges on said capacitors, and reinforcing the currents in said windings by discharging said capacitors through said motor windings.

9. The process of claim 8 comprising triggering thyristors connected in series with said motor windings to produce motoring current in said windings and commutating said thyristors at the beginning of said reinforcing steps by discharging said capacitors.

10. The process of claim 6 comprising charging capacitors from said energy sources, reversing the charges on said capacitors, and reinforcing the currents in said windings by discharging said capacitors through said motor windings.

11. The process of claim 6 comprising triggering thyristors connected in series with said motor windings to produce motoring current in said windings and commutating said thyristors at the beginning of said reinforcing steps by discharging said capacitors.